April 1, 1952        O. SCHREINER        2,591,380
CONVERTIBLE AUTOMOBILE BODY STRUCTURE
Filed Dec. 27, 1948
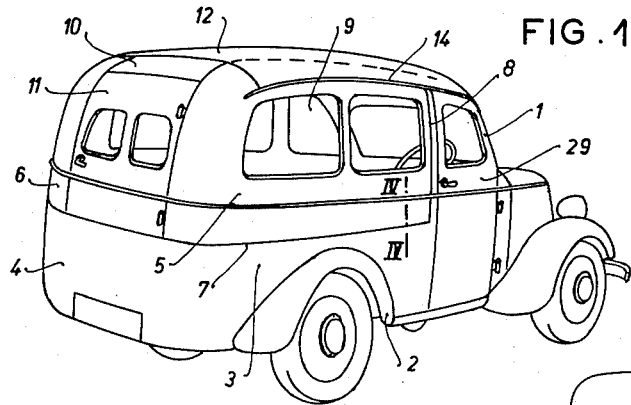
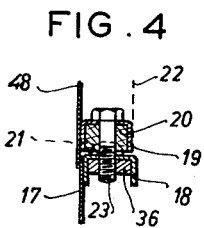
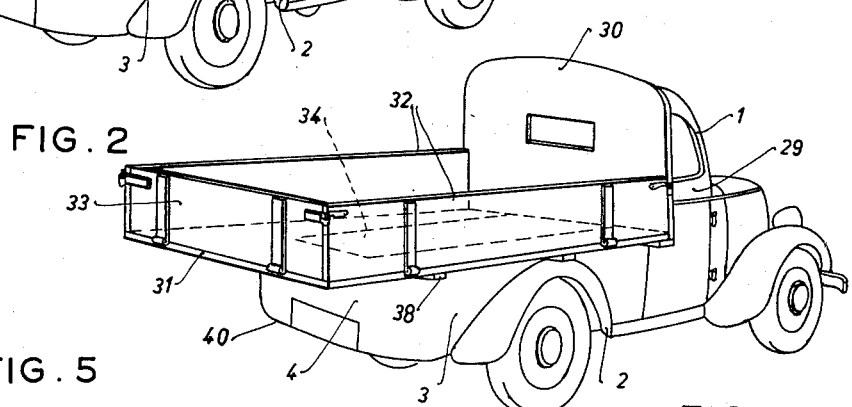
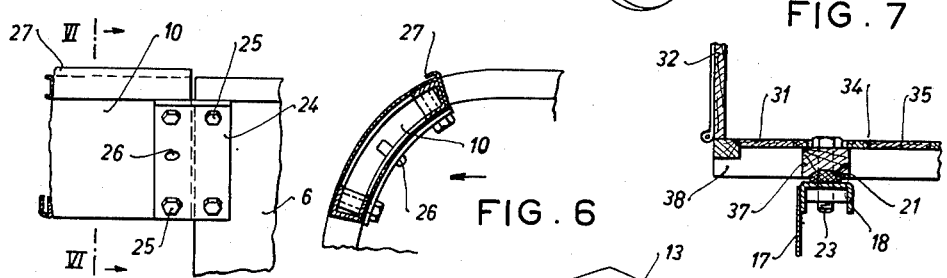
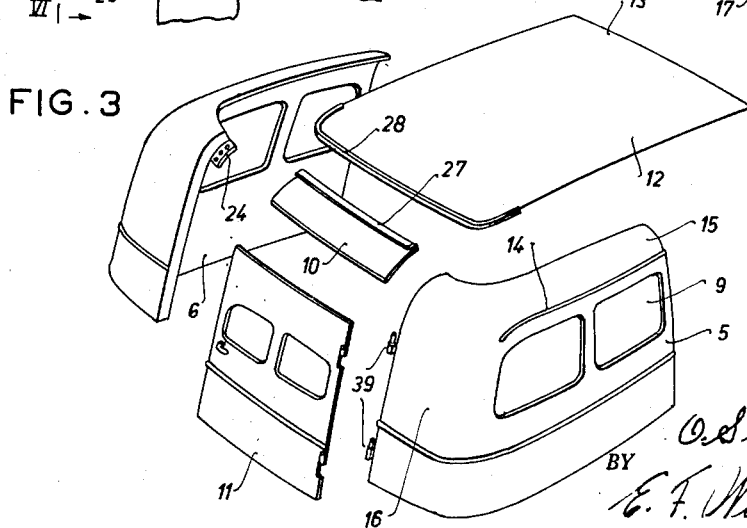
INVENTOR.
O. Schreiner
BY
E. F. Wenderoth
Atty Patented Apr. 1, 1952

2,591,380

UNITED STATES PATENT OFFICE 2,591,380

CONVERTIBLE AUTOMOBILE BODY STRUCTURE

Otto Schreiner, Vienna, Austria

Application December 27, 1948, Serial No. 67,415
In Austria April 16, 1948

3 Claims. (Cl. 296—28)

This invention relates to vehicle bodies and, more particularly, to the bodies of automobiles which can be converted so as to be adapted for use either as a private passenger-carrying vehicle or as a commercial or goods-carrying vehicle.

It has already been proposed to provide vehicle bodies of this kind wherein, for the purpose of conversion of a passenger vehicle into a commercial vehicle, provision is made for completely removing as a single unit that portion of the vehicle body which is disposed behind the driver's cab and above the rear fenders. According to an alternative known proposal, the upper parts of the side and rear walls of the body are adapted to be folded down. Neither of these proposals has been found satisfactory in practice. In the first case, the removable portion is of considerable bulk and weight, and is thus very difficult to detach from the fixed part of the body, to transport to a place of storage and, when required, to replace upon the fixed part, whilst also presenting difficulties in the provision of a satisfactory method of securing it to the fixed part of the body. The other proposal necessitates a relatively complex construction. Owing to the numerous hinges which are required for this construction, it is difficult to avoid rattling of the component sections, and moreover the hinges, fastening means and like fittings which are visible on the outside of the body impair the appearance of the vehicle when it is to be used as a passenger automobile. In addition to this, there is a danger of breakage of the windows which are provided in the side walls.

It is an object of the present invention to provide a vehicle body of the kind above referred to in which the removable sections are sufficiently small and light for them to be removed, transported and, when required, replaced with comparative ease.

Another object of the invention is to provide a vehicle body of the kind referred to having a satisfactory and firm connection of the removable sections with each other and with the non-removable part of the vehicle body.

A further object is the provision of a vehicle body of this kind in which the removable sections are so constructed that they form relatively stiff and non-deformable units which do not require any special stiffening or other reinforcing means to be provided thereon to give them the necessary strength, so that their weight can be kept low.

Yet another object of this invention is to provide a vehicle body of the above kind in which the appearance of the vehicle, when used as a private passenger vehicle, is not impaired but is practically indistinguishable from an ordinary passenger automobile of normal appearance.

A preferred embodiment of the invention is shown by way of example in the accompanying drawings wherein:

Fig. 1 shows a perspective view of the vehicle after conversion into a closed or saloon type private passenger automobile;

Fig. 2 is a similar view of the vehicle after conversion into an open commercial automobile or truck of the platform or drop-side body type;

Fig. 3 shows perspectively the individual removable sections of the vehicle body;

Fig. 4 is a vertical section taken on the line IV—IV of Fig. 1 and illustrates the method of connection between the removable side wall sections and the fixed part of the body;

Fig. 5 is a fragmentary elevation viewed in the direction of the arrow in Fig. 6 and showing the connection between a removable transverse member with a likewise removable side wall section;

Fig. 6 is a section on the line VI—VI of Fig. 5, and

Fig. 7 is a transverse section showing the method of connection of the platform of the vehicle to the fixed part of the body.

In the form shown, the vehicle comprises a front body portion 1 which is constructed in the conventional manner as a driver's cab and which is rigidly connected with the vehicle chassis, as are also the lower portions 3 and 4 of the side walls and rear wall respectively which extend upwardly to approximately the top of the rear fenders 2. When the vehicle takes the form of a passenger automobile as shown in Fig. 1, removable side wall sections 5 and 6 (Fig. 3) are mounted behind the cab 1 and above the side wall portions 3, being joined to the latter along the edges 7 and 8 thereof. The side wall sections 5 and 6 are fitted with windows 9 and are connected together at their rear upper corners by means of a likewise removable transverse connecting section 10. The rear wall of the body is completed by a door 11 which is hung on hinge members 39 fitted on the side wall section 5. Preferably, the body is closed by a roll top 12 of flexible material, the front edge 13 of which is adapted to be secured to the cab 1 whilst laterally it extends down to the usual drip mouldings 14 provided along the top of the side wall sections 5 and 6.

Since the top portions 15 and the rear portions 16 of the side wall sections 5 and 6 are to a large extent in a plane transverse to the main plane of these sections and are moreover curved at the top and rear, sufficient rigidity is thereby imparted to these sections, and no special stiffeners or reinforcements therefor are required. This is also true of the transverse connecting section 10 which is likewise curved. Accordingly, it is possible to make the sections 5, 6 and 10 of relatively light weight.

As will be seen from Fig. 4, the fixed side wall portions comprise a sheet metal skin 17, along the top edge 7 of which there is connected a steel channel-section member 18. Connected to the lower edge of the sheet metal skin 48 of the removable side wall sections 5 and 6 is a similar channel-section member 19 which is filled with a wood strip 20. The underside of the latter is lined with a rubber beading 21 to provide a tight joint against the top of the channel-section member 18. A fabric or other lining 22 or any panelling such as is customary for the interior of the vehicle body is fastened to the inside of the channel section member 19. The connection between the removable side wall sections 5 and 6 on the one hand and the fixed side wall portion 3 of the body on the other hand is effected by means of a few bolts 23 which are spaced along the length of the side wall portion 3 and are screwed into tapped metal plates 36 secured on the inside to the web of the channel-section member 18. In order to provide access to the heads of the bolts 23, small flaps are provided on the lining 22 adjacent the bolt holes. A similar method is used for connecting the side wall sections 5, 6 with the cab 1.

As shown in Figs. 5 and 6, a fish-plate 24 is secured by screws 25 upon the upright rear edge of each of the side wall sections 5 and 6. These fish-plates project beyond the respective side wall section edges and provide a means for the attachment of the ends of the transverse connecting section 10. The latter is secured to the fish-plates 24 by means of similar screws 25, and its precise position relatively to the side wall sections 5 and 6 is determined and fixed by a stud 26 on the fish-plate 24 projecting outwardly from the latter to engage in a corresponding hole in the transverse connecting section 10, the stud being an exact fit in said hole. Secured to the upper longitudinal edge of the transverse connecting section 10 is a metal strip 27 having its upper, projecting portion bent at right angles to form an elongated hook in which the suitably shaped rigid rear edge 28 of the roll top 12 may be engaged and held.

The interior of the passenger automobile shown in Fig. 1 is accessible through the side doors 29, for which purpose the front seat next to the driver's seat may be arranged to tip up in known manner. All the seats behind the cab 1 are detachably secured in the vehicle body in any convenient manner, and it is possible for the vehicle, after removal of these seats, to be used as a delivery automobile, the goods being loaded and unloaded through the rear door 11.

For conversion of this vehicle into a commercial vehicle of the platform body type, the side wall sections 5 and 6, the transverse connecting section 10, the door 11 and the roll top 12 are detached and removed. The rear of the cab 1 is closed by a likewise removable partition wall section 30 which is secured in position in any convenient and desired manner (Fig. 2). A platform 31 is then placed in position. It projects laterally and rearwardly beyond the fixed portions of the vehicle body. In the embodiment according to Fig. 7, the platform is supported by two longitudinal members 37 which are interconnected by cross-members 38. As will be seen in Fig. 7, each of the longitudinal members 37 is secured to the channel-section member 18 of the fixed side wall portion 3 by means of screws 23 in a manner similar to the method of connection of the side wall sections 5 and 6 as shown in Fig. 4.

If it is desired to convert the vehicle body into the drop-side type instead of the flat platform type, two side boards 32 and a tail board 33 may be hingedly connected to the platform 31 so as to be capable of being folded down. It may also be found to be advantageous in some cases to provide the platform longitudinally and centrally thereof with a rectangular opening 34 which is indicated by the dotted lines in Fig. 2 and which can be closed by a removable cover 35 (Fig. 7). The cover 35 gives access to the space beneath the platform 31, i. e. the compartment between the latter and the floor 40 of the vehicle body, and enables this compartment to be utilised for accommodating suitable goods, e. g. articles of small bulk. This form of vehicle is suitable, as a temporary expedient, for casual use in transporting passengers, the latter being seated upon seat cushions placed on the platform 31 around the opening 34 with the drop sides 32 serving as back rests and the passengers' feet being accommodated in the compartment or well beneath the platform 31.

If only merchandise or other freight of small bulk or weight is to be carried, the platform 31 may be omitted altogether, in which case the well or box formed by the fixed side and rear wall portions 3 and 4 of the floor 40 is used as a freight receptacle.

Removal of the partition wall section 30 and (if provided) of the platform 31, the side and tail boards 32 and 33 and the members 37 and 38 and replacement of the sections shown in Fig. 3 enables the vehicle body to be re-converted into that of a private passenger or a delivery automobile.

It will be apparent that, while a preferred embodiment of the invention has been hereinbefore disclosed, many changes may be made in the combination and arrangement of parts and in the details of construction thereof. Thus, for example, while the method of connection of the removable sections with each other and with the fixed portions of the vehicle body have been shown for simplicity as being by means of bolts, these connections may be by means of eccentric fastening devices comprising pivotable operating levers, such as are known for analogous purposes. Another possible modification is to provide a removable rear wall section instead of the rear door 11, such rear wall section being preferably formed integrally with the transverse connecting section 10 and being detachably connected with the two side wall sections 5 and 6 by bolts or like fastening means. Again, a removable rigid roof section may be provided instead of the roll top 12. The various removable sections may be constructed in any convenient manner known or customary in the art of body-building.

All the foregoing and other modifications and embodiments which will readily occur to those skilled in the art may be made without departing from the spirit of the present invention which is therefore not deemed to be limited to the forms herein described and shown or otherwise than as defined within the scope of the claims appended hereto.

What I claim is:

1. An automobile body convertible for use either as a closed passenger vehicle or as a truck, and adapted to be fixed to a chassis, said body comprising a driver's cab, rear fenders, two lateral portions and a rear portion, said portions extending upwardly substantially to the top of said rear fenders, two opposite, removable, separate side wall sections extending behind said cab and above said lateral portions, said side wall sections comprising, at their upper, longitudinal edges and at their rear upright edges, curved portions directed towards each other, a separate, removable rear wall section between said side wall sections, a removable roof, a separate, removable, transverse member on the rear upper corner of the vehicle, and means for detachably uniting said side wall sections with said rear wall section and said transverse member on the one hand, and with said fixed body on the other hand, said curved portions of the members imparting rigidity thereto.

2. An automobile body convertible for use either as a closed passenger vehicle or as a truck, and adapted to be fixed to a chassis, said body comprising a driver's cab, rear fenders, two lateral portions and a rear portion, said portions extending upwardly substantially to the top of said rear fenders, two opposite, removable, separate side wall sections extending behind said cab and above said lateral portions, said side wall sections comprising, at their upper, longitudinal edges and at their rear upright edges, curved portions directed towards each other, a separate, removable, transverse member on the rear upper corner of the vehicle, a separate, removable door arranged beneath said transverse member and between said side wall sections, a removable roof, and means for detachably uniting said side wall sections with said transverse member and with said fixed body.

3. An automobile body as claimed in claim 2, and wherein said means for detachably uniting said side wall sections with said transverse member comprises a fish-plate curved to the contours of the rear upright edges of said side wall sections and said transverse member, means removably securing said fish-plate to said transverse member and said side wall sections, a stud projecting from said fish-plate, said transverse member having a hole therein of exact size with said stud, said stud fitting in said hole to precisely position said transverse member and said side wall sections.

OTTO SCHREINER.

REFERENCES CITED

The following references are of record in the file of this patent:

UNITED STATES PATENTS

| Number | Name | Date |
|---|---|---|
| 173,897 | Chenette | Feb. 22, 1876 |
| 845,844 | Beecher | Mar. 5, 1907 |
| 1,405,486 | Carrm | Feb. 7, 1922 |
| 1,608,228 | Parke et al. | Nov. 23, 1926 |
| 1,775,251 | Lundahl | Sept. 9, 1930 |
| 2,307,172 | Vanhooser | Jan. 5, 1943 |

FOREIGN PATENTS

| Number | Country | Date |
|---|---|---|
| 365,929 | Great Britain | Jan. 28, 1932 |
| 423,338 | Germany | Dec. 30, 1925 |